(12) United States Patent
Palaios et al.

(10) Patent No.: US 12,144,061 B2
(45) Date of Patent: Nov. 12, 2024

(54) CLUSTERING OF USER ENTITIES IN A CELLULAR NETWORK

(71) Applicant: Telefonaktiebolaget LM Ericsson (publ), Stockholm (SE)

(72) Inventors: Alexandros Palaios, Moers (DE); Ali El Essaili, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 349 days.

(21) Appl. No.: 17/616,588

(22) PCT Filed: Jun. 6, 2019

(86) PCT No.: PCT/EP2019/064845
§ 371 (c)(1),
(2) Date: Dec. 3, 2021

(87) PCT Pub. No.: WO2020/244767
PCT Pub. Date: Dec. 10, 2020

(65) Prior Publication Data
US 2022/0232368 A1    Jul. 21, 2022

(51) Int. Cl.
*H04W 8/18* (2009.01)
*H04L 67/303* (2022.01)
*H04L 67/306* (2022.01)
*H04L 67/50* (2022.01)
*H04W 4/029* (2018.01)

(52) U.S. Cl.
CPC ......... *H04W 8/186* (2013.01); *H04L 67/303* (2013.01); *H04L 67/306* (2013.01); *H04L 67/535* (2022.05); *H04W 4/029* (2018.02)

(58) Field of Classification Search
None
See application file for complete search history.

(56) References Cited

U.S. PATENT DOCUMENTS

2016/0366565 A1* 12/2016 Fjelberg ............... H04W 24/02
2017/0279829 A1*  9/2017 Vasseur ............. H04L 63/1458

FOREIGN PATENT DOCUMENTS

EP    3 223 485 A1    9/2017

OTHER PUBLICATIONS

International Search Report and Written Opinion dated Mar. 9, 2020 in International Application No. PECT/EP2019/064845 (10 pages total).

* cited by examiner

*Primary Examiner* — Frantz Bataille
(74) *Attorney, Agent, or Firm* — Rothwell, Figg, Ernst & Manbeck, P.C.

(57) ABSTRACT

The invention relates to a method for grouping a plurality of user entities connected to a cellular network into different clusters, the method comprising: —collecting, for each of the plurality of user entities, activity information comprising different activity parameters, each activity parameter describing an activity of the corresponding user entities in the cellular network, —generating, for each of the plurality of user entities, a user profile comprising the activity parameters for the corresponding user entity, —grouping the plurality of user entities into the different clusters based on a similarity of the activity parameters of the user profiles.

19 Claims, 11 Drawing Sheets

| Time stamp | UE information | | gNB | |
|---|---|---|---|---|
| | Traffic patterns | Location Information (might include multiple sources) | Consumed Resources, Assigned QCIs | Visited gNBs |
| 12:05 | Data rate | Location | QCI, allocated PRBs | Characterization of delivered QoS |
| 12:33 | Data rate | Location | QCI, allocated PRBs | Characterization of delivered QoS |

| Time stamp | UE information | | gNB | |
|---|---|---|---|---|
| | Traffic patterns | Location Information (might include multiple sources) | Consumed Resources, Assigned QCIs | Visited gNBs |
| 12:05 | Data rate | Location | QCI, allocated PRBs | Characterization of delivered QoS |
| 12:33 | Data rate | Location | QCI, allocated PRBs | Characterization of delivered QoS |

| UE Id | Cluster 1 | Cluster 2 | Cluster 3 |
|---|---|---|---|
| 1001 | 1 | 0 | 0 |
| 1002 | 0 | 0 | 1 |
| 1003 | 0 | 1 | 0 |
| 1004 | 1 | 0 | 0 |

31

UE id: 1001

| Cluster Prediction | Prediction Accuracy |
|---|---|
| 1 | 95% |
| 2 | 3% |
| 3 | 2% |

UE id: 1002

| Cluster Prediction | Prediction Accuracy |
|---|---|
| 1 | 8% |
| 2 | 1% |
| 3 | 91% |

UE id: 1003

| Cluster Prediction | Prediction Accuracy |
|---|---|
| 1 | 1% |
| 2 | 98% |
| 3 | 1% |

UE id: 1004

| Cluster Prediction | Prediction Accuracy |
|---|---|
| 1 | 60% |
| 2 | 20% |
| 3 | 20% |

| Cluster Prediction | Prediction Accuracy |
|---|---|
| 3 | 35% |
| 65 | 35% |
| 81 | 30% |

~ 51

| Cluster Prediction | Prediction Accuracy |
|---|---|
| 3 | 95% |
| 65 | 3% |
| 81 | 2% |

| Cluster Prediction | Prediction Accuracy |
|---|---|
| 3 | 95% |
| 65 | 3% |
| 81 | 2% |

CLUSTERING OF USER ENTITIES IN A CELLULAR NETWORK

CROSS REFERENCE TO RELATED APPLICATION

This application is a 35 U.S.C. § 371 National Stage of International Patent Application No. PCT/EP2019/064845, filed Jun. 6, 2019.

TECHNICAL FIELD

The present application relates to a method for grouping a plurality of user entities connected to a cellular network into different clusters and relates to the corresponding network entity. Furthermore, a system comprising two of the network entities, a computer program and a carrier comprising the computer program is provided.

BACKGROUND

Artificial intelligence (AI) relevance is growing across different industries. AI provides enabler functions for system optimizations where complex and large data needs to be analyzed. More specifically, AI and machine learning (ML) are being considered as enablers at RAN (Radio Access Network), e.g. 3GPP RAN study item addressing AI/ML for NR (New Radio).

Among the foreseen improvements from using AI/ML technology are performance optimizations [QoS (Quality of Sevice), QoE (Quality of Experience), coverage, etc.], and system configuration and maintenance (e.g., outage prediction, root cause analysis).

3GPP has defined mechanisms for QoS management. 3GPP TS 23.501 defines 5G QoS model (resource type, priority level, packet delay budget, packet error rate, etc.) and 5QI (5G QoS Indicator) to QoS mapping characteristics. 3GPP TR 23.786 considers support for eV2X in 5GS, including enhancements to the standardized 5QI to QoS mappings in 3GPP TS 23.501. 3GPP TR 23.786 defines solutions for the application function to influence the eV2X QoS in the 5G network (PCF, Policy Control Function). The application provides QoS parameter sets indicating desired QoS characteristics and the network informs the application about the fulfilment/unfulfillment of the requested QoS.

In the currently used cellular networks there is no way to have a powerful and compact representation of the active users in a way that decisions can be taken or enabled without collecting and using large size of information.

At the same time the cellular networks cannot exploit the strong similarities in the activity patterns of the user equipment or user entities, UE. By way of example industrial user entities or IoT devices have fixed and strong periodicities. Furthermore, human users of the user entities often use the same trajectories with similar data traffic patterns, e.g. when commuting.

Typical user profile techniques are based on collecting large amounts of data, leading to expensive hardware components for storing and processing.

SUMMARY

Accordingly, a need exists to overcome the above-mentioned problems and to provide a basis allowing to describe a large number of user entities with a small amount of data.

This need is met by the features of the independent claims. Further aspects are described in the dependent claims.

According to a first aspect a method for grouping a plurality of user entities connected to a cellular network into different clusters is provided, wherein for each of the plurality of user entities activity information is collected comprising different activity parameters, wherein each activity parameter describes an activity of the corresponding user entity in the cellular network. Furthermore, for each of the plurality of user entities a user profile is generated which comprises the activity parameters of the corresponding user entity. Furthermore, the plurality of user entities are grouped into different clusters based on a similarity of the activity parameters of the user profiles.

By grouping the user entities into different clusters based on the activity parameters, user entities having different activity parameters can be grouped together and described by the similarity of the activity parameters stored in the user profiles. The user profile can comprise activity parameters, such as a data traffic pattern of the corresponding user entity, location information of the corresponding user entity, the consumed radio resources of the user entity, the visited radio access nodes and an assigned quality of service assigned to the user entity. Accordingly, UE based or UE originating features and radio access network based or RAN originating features can be used to generate the user profile.

Furthermore, the corresponding network entity is provided configured to group the plurality of user entities connected to the cellular network into different clusters. The network entity comprises a memory and at least one processing unit, wherein the memory contains instructions executable by the at least one processing unit. The network entity is then operative to carry out a method as mentioned above or as discussed in further detail below.

As an alternative, a network entity is provided configured to group the plurality of user entities connected to a cellular network into different clusters, the network entity comprising a first module configured to collect, for each of the plurality of user entities, activity information comprising the different activity parameters. A second module is provided configured to generate a user profile for each of the user entities comprising the activity parameters for the corresponding user entity. The network entity comprises a third module configured to group the plurality of user entities into different clusters based on the similarity of the activity patterns of the user profiles.

Furthermore, a computer program comprising program code to be executed by at least one processing unit of the network entity is provided, wherein execution of the program code causes the at least one processing unit to execute a method as mentioned above or as discussed in further detail below.

Additionally, a carrier is provided comprising the computer program, wherein the carrier is one of an electronic signal, optical signal, radio signal, or a computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may be implemented by an indirect connection or coupling. The coupling between the components may be established over a wired or wireless connection. The functional blocks may be implemented in hardware, software, firmware or a combination thereof. Within the context of the present application, the term "mobile entity", "user equipment" or "user entity", UE, refers to a device for instance used by a person, a user, for his or her personal communication. It can be a telephone type of device, for example a telephone or a session initiation protocol or voice over IP phone, a cellular telephone, a mobile station, a cordless phone, a personal digital assistance type of device like a laptop, notebook or tablet equipped with a wireless data connection. The UE may also be associated with nonhumans like animals, plants or machines. A UE may be subscribed with a subscriber identity module, SIM, comprising unique identities such as the International Mobility Subscriber Identity, IMSI, the Temporary Mobile Subscriber Identity, TMSI, or the Globally Unique Temporary UE Identifier, GUTI, associated with the user using the UE. This customizes the UE uniquely with a subscription of the user.

For the sake of clarity, it has to be noted that there is a difference, but a tight connection between a user and the subscriber. The user gets access to the network by acquiring a subscription to the network and by that becomes a subscriber within the network. The network then recognizes the subscriber, e.g. with the information such as IMSI or TMSI or the like, and uses the associated subscription to identify related subscriber data. A user can be the actual user of the UE and the user may also be the one owing the subscription, but the user and the owner of the subscription may be different.

One of the main aspects of the application described below relates to the grouping of users into clusters, the clustering of users based on similarity matching of the UE characteristics. In the following the term "user profile" is used to describe information about the UE activity, such as the location of the UE, the resources consumed by the UE, and information from the radio access node to which the UE is connected. The UEs are then clustered into groups based on machine learning trying to increase the matching of future UEs into the right group. By way of example such a group will be for New Radio Industrial Internet of Things devices, NR-IIoT devices, or users where the traffic has a low bitrate, but is highly periodic. Another cluster can comprise the commuters at work where they produce bursts of data traffic typically at specific time frames, e.g. during the commute time in a train or in a bus.

After the clustering the cellular network, by way of example a 5G network, can enable new features using the similarity between the UEs, and can improve scheduling, admission control and can easily characterize or group newly arriving UEs appearing for the first time in the cellular network.

Although the present invention is described within the context of 3GPP NR radio technology, it is understood that the problems and solutions described herein are equally applicable to wireless access networks and user equipment (UE) implementing other access technologies and standards. NR is used as an example technology for description due to easy understanding of the problem and solutions solving the problem. The invention is applicable also to 3GPP LTE, or 3GPP LTE and NR integration, also denoted as non-standalone NR.

Figure 1:
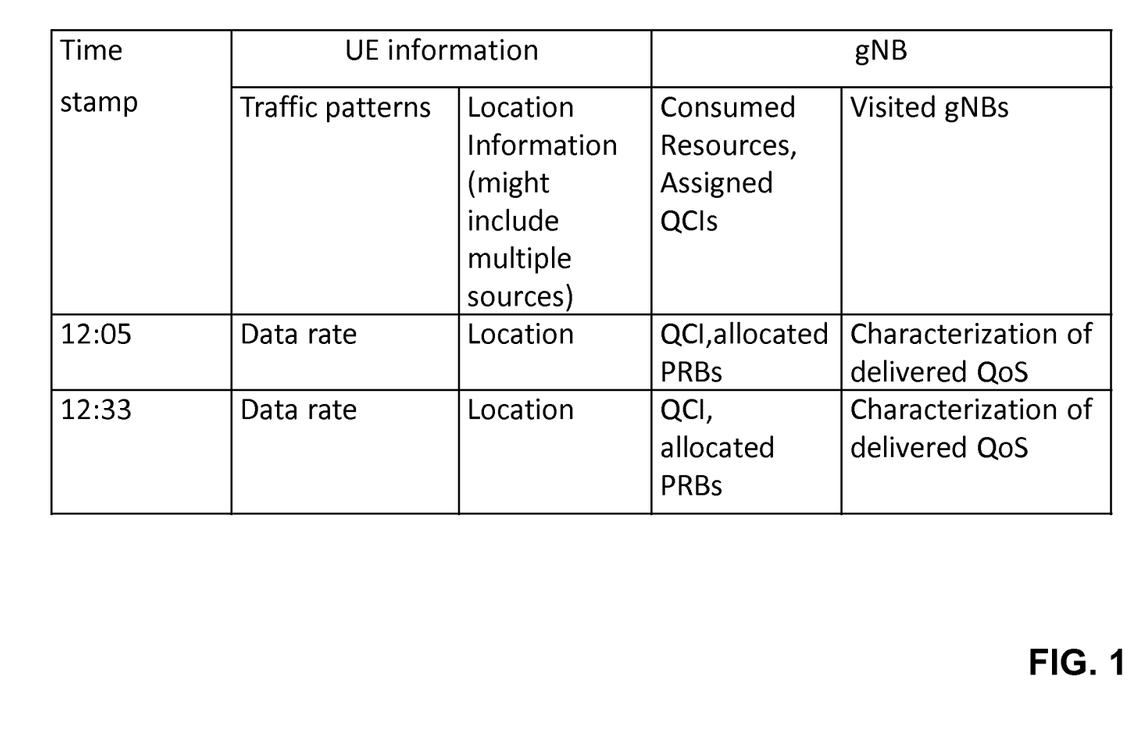
FIG. 1 shows a schematic representation of a table containing data fields that are used for the generation of a user profile.

In the following first part the generation of the user profiles will be discussed in more detail. The user profile enables the clustering of the UEs based on multiple features, such as the consumed radio resources from the UE, the location information, the visited radio access nodes, the traffic model characteristics, such as periodic or continuous data transmission, or the assigned quality of service class identified, QCI. These activity patterns are recorded over time as shown in FIG. 1.

In the following it is described what type of information can be used as input for the creation of a user profile:

A first activity parameter is the traffic pattern of the UE, such as the data rate, periodic versus continuous data transmission.

The location information of the UE. As an example some of the following fields can be used to capture the position of the user entity, the GPS coordinates generated by the GPS receiver of the UE, a cell identified or cell ID identifying the cell in which the UE is located in the cellular network, or a GeoFence identifier. Instead of GPS any other satellite based position system can be used.

The consumed radio resources at the radio access node per UE and the assigned QCI from the cellular network.

The visited radio access nodes the UE visited in the past.

A network entity in the cellular network, e. g. collocated to the radio access nodes can then create the user profiles that are constantly updated with new entries with fields as described above or as shown in FIG. 1. If a profile for a UE does not exist, the network entity will first create the necessary structure to store the information and will then continuously track and store the information as described above. FIG. 1 shows the different groups of collected information, namely the information related to the UE and the radio access network related information shown for an example of a 5G network as gNodeB.

Figure 2:
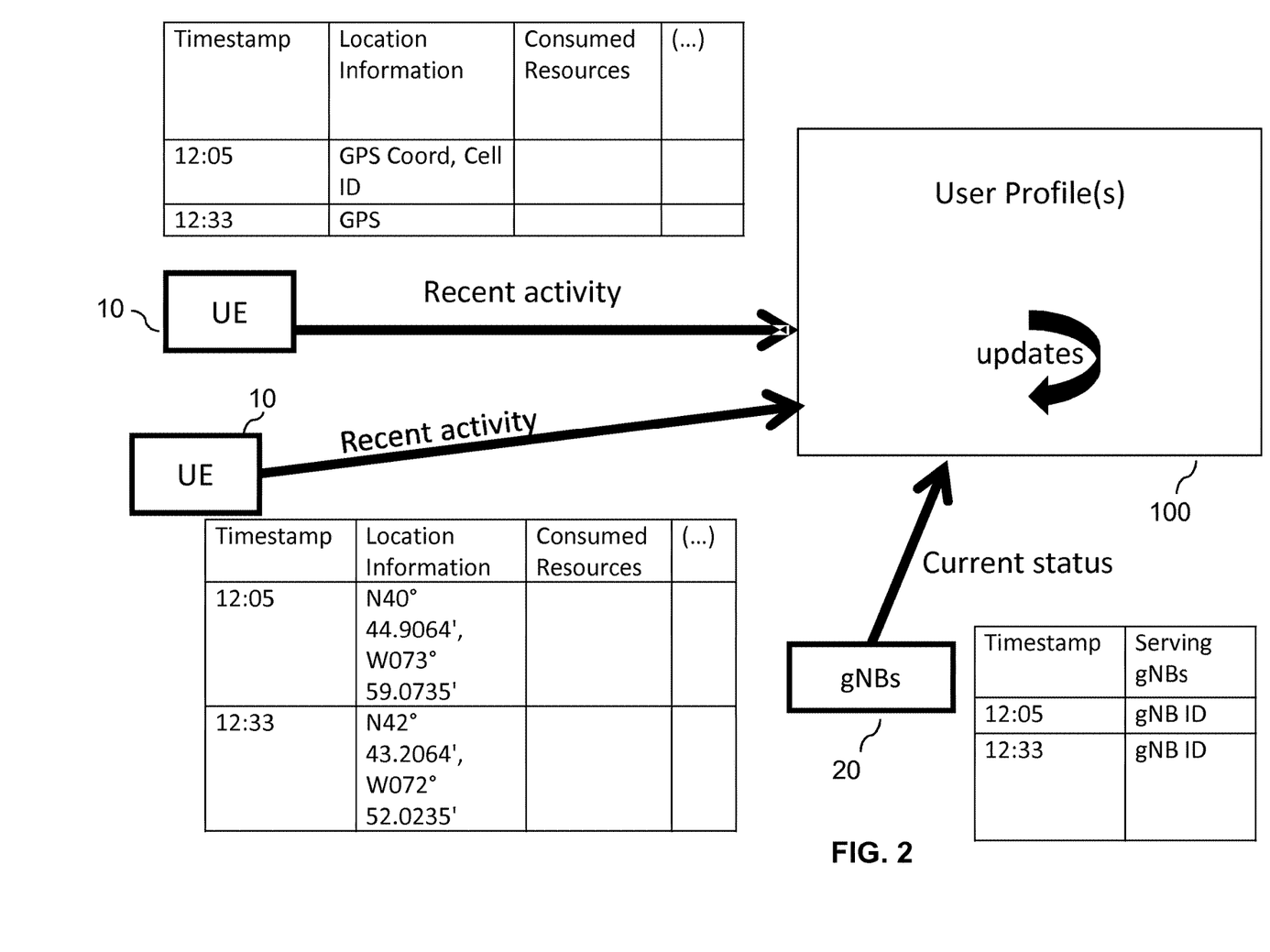
FIG. 2 shows a schematic view of the creation of user profiles before a clustering is carried out.

FIG. 2 shows an example of how the user profile as shown in FIG. 1 is generated. Different UEs 10 connected to a radio access network node 20 have different activities in the network. This activity is collected by a network entity 100 which generates the user profiles. The entity 100 can be part of a radio access node 20 or can be located near a radio access node. The UEs provide the activity patterns related to the UE, such as the location information, wherein the radio access node 20 provides the radio access node related activity parameters, such as the visited radio access nodes or the consumed radio resources.

In the following the clustering of the user entity as a compact representation of the UEs is described in more detail.

Clustering belongs to one of the most important unsupervised learning problems. The goal is to find a structure inside a collection of unlabeled data features, here the activity parameters. In other words there will be a collection of data sets which is organized into groups in a similar way. The clustering or unsupervised learning is used as the UEs and the radio access network nodes can collect datasets of very large sets of features. The labelling of these datasets by hand is normally not very realistic.

The present application is not restricted to a certain clustering algorithm. Many clustering algorithms are known, such as the exclusive clustering, overlapping clustering, hierarchical clustering, probabilistic clustering etc., and might be used as clustering method. One possibility for clustering the UEs is to perform the clustering such that a user entity is only grouped into one cluster, which also named as "hard labeling", where one label or one cluster is assigned based on the maximum probability of each class or cluster. However, it is also possible to use a mixture known as "soft labeling". According to this soft labeling, multiple clusters are allowed and the machine learning technology declares in which classes a specific input vector comprising the activity parameter might belong to.

Figure 3:
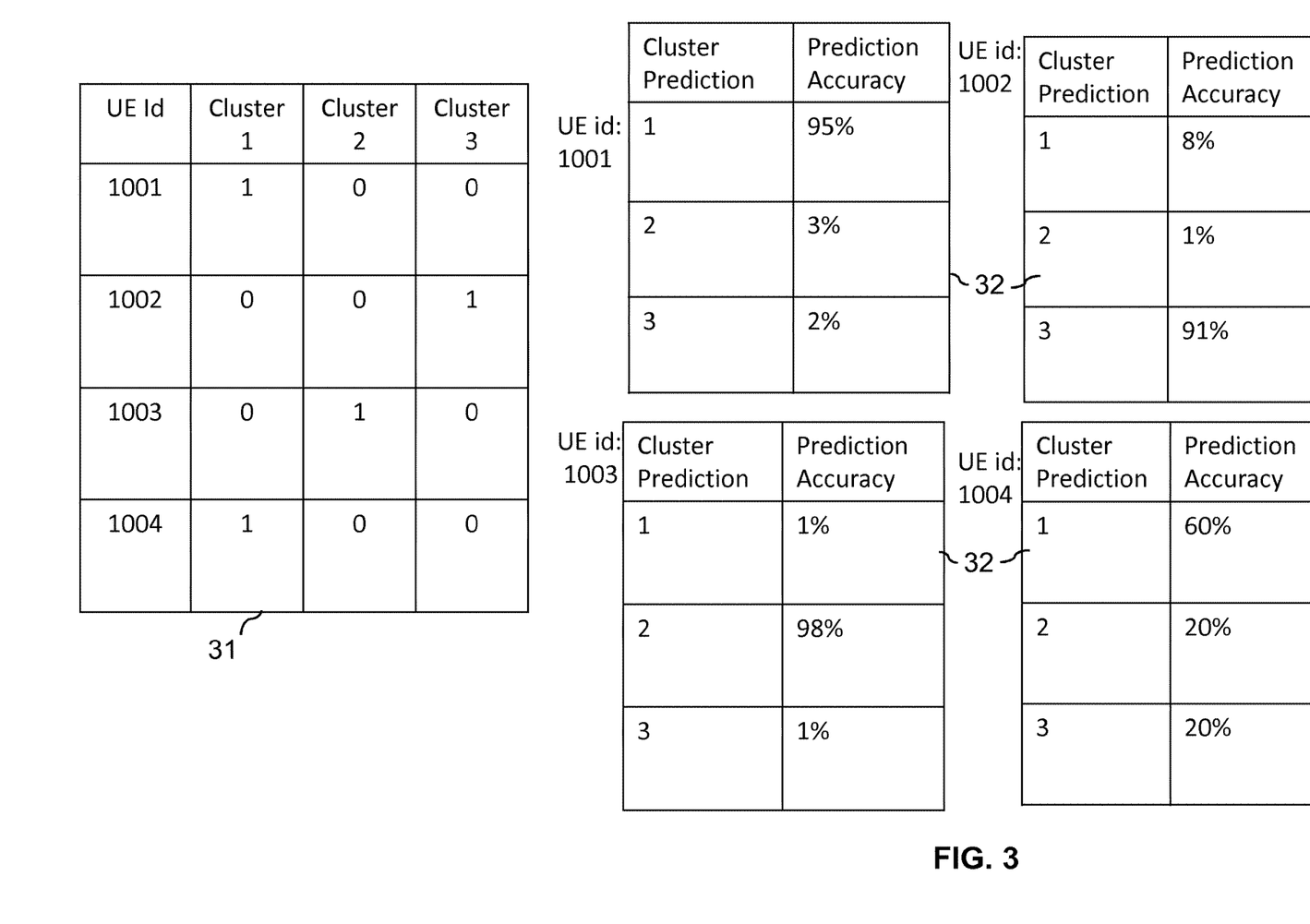
FIG. 3 shows a schematic example view of how a user entity can be either grouped into one or several clusters.

FIG. 3 shows one example of the hard labeling in table 31 in which each UE is only grouped into one cluster. On the right side the accuracies are shown for different UEs in table 32 indicating the likelihood with which a UE belongs to a certain cluster. By way of example as shown in the right part of FIG. 3 the UE having the ID of 1001 belongs with a likelihood or a prediction accuracy of 95% to a first cluster, with a likelihood of 3% to a second cluster and with a likelihood of 2% to a third cluster. Accordingly, each UE belongs with a specific percentage to the different clusters.

Figure 4:
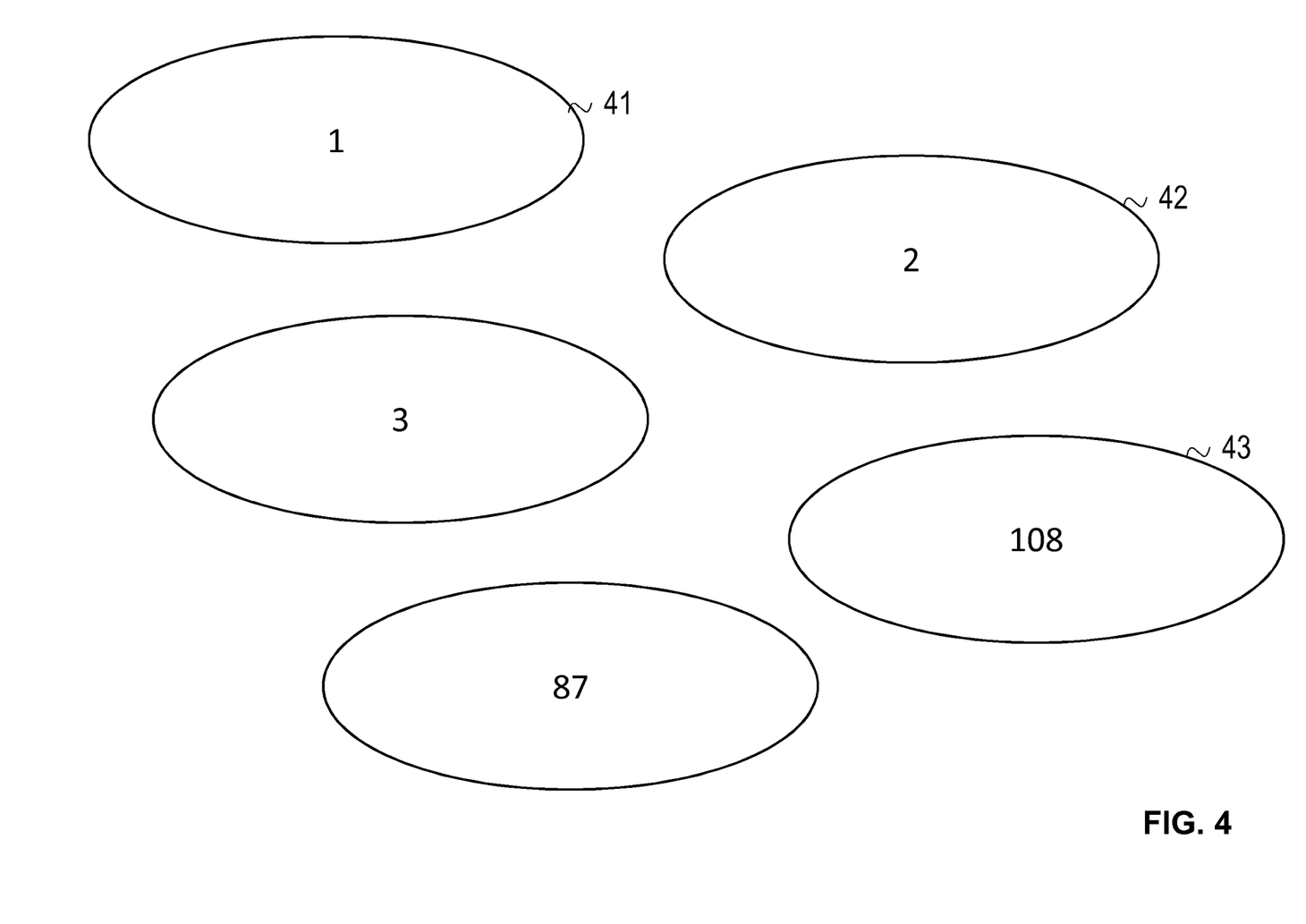
FIG. 4 shows an example schematic view of the generated clusters so that the different types of user entities are grouped into different categories having same or similar patterns.

FIG. 4 shows an example of clustering based on the user profiles. By way of example the system has calculated 108 different clusters and only some of the clusters are shown. Each cluster contains a large number of UEs that share quite similar characteristics or activity parameters as they were picked from the unsupervised learning technique. The features are based on the input so that the user entities are being clustered based on those. In FIG. 4 a label is provided per cluster to increase the understanding how clusters might be potentially created, but the unsupervised learning technique only finds the clusters and the assignments of the user to the clusters. In the example shown in FIG. 4 a first cluster 41 is provided in which e. g. UEs having a constantly low data generation are grouped together. The data generated show a constant behavior or a typical periodicity. In cluster 42 all the UEs are grouped into a group which, by way of example, commutes by train so that they have the same trajectories and a similar bursty traffic during the commuting time.

As a further example another cluster 43 is shown which stores the UEs having a critical communication pattern. The data traffic activity of the UE starts after the device signs in to the network. For each cluster a cluster specific user profile is generated describing the typical actually parameters of the UEs in the cluster. This can be a simple averaging of all user entity specific user profile in the cluster. Any other calculation of the cluster specific user profile can be used.

At the beginning the network or the entity carrying out the steps has to use an initial learning period to collect the first measurements and perform the needed clustering. The initial period is installation specific and can depend on the specific installation site and the number of users. The training period can be stopped when adding more measurements does not change drastically the already existing clusters, meaning that when the number of clusters does not change by more than a threshold number, the clustering can be stopped. When the number reaches a constant value, this can be seen as a sign that the model has already learned the needed clusters. Once the training phase or training period is completed, the system is at the running phase where the new users can be classified to one of the existing clusters. Furthermore, during the running phase more measurements can be collected and the model can be retrained. For starting the retraining, a fixed time interval may be used. As an alternative, the performance of the clustering can be checked, and when the performance is dropped, the retraining can be started. This is shown in connection with FIG. 5.

Figure 5:
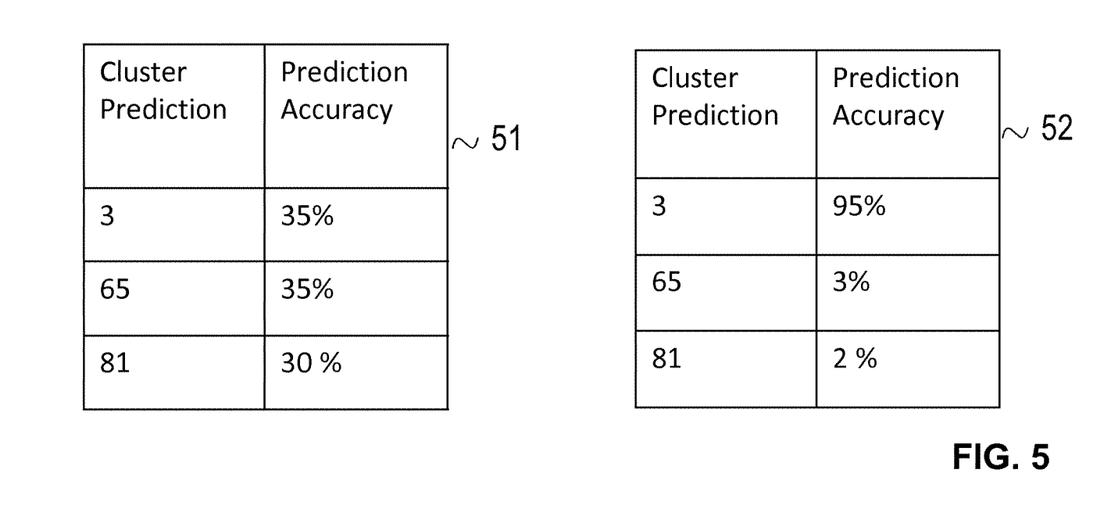
FIG. 5 shows an example schematic view of a grouping with a poor and a good clustering performance.

FIG. 5 shows a first cluster prediction data set for a UE in table 51 in which the prediction accuracy is nearly evenly distributed for the different cluster numbers indicated. In the dataset of table 52 an example is shown for which a retraining might not be necessary, whereas a retraining might be necessary for the dataset of table 51. For the dataset 52 the UE belongs with a very high likelihood to only one cluster, wherein the likelihood or prediction accuracy for the other clusters is considerably lower. Accordingly, when the prediction accuracy is high for more than two clusters and if the number of UEs is high for which this phenomenon occurs, a retraining might be necessary, or the training has to be continued in the first training phase.

For the dataset in table 51 the clustering method cannot clearly differentiate the UE between the clustering and picks at quite equal proportions three clusters. In table 52 the clustering clearly indicates that the UE belongs to one cluster, namely the cluster with the number 3 in the example shown. During the running phase, when a new UE enters the network or is connected to the network, once a new UE appears the first measurements are collected by the network or the entity 100 shown in FIG. 2. With the first measurements a first matching of the UE to the clusters is attempted in order to check which cluster has UEs with similar user profiles when the newly detected activity and activity parameters are compared to the parameters in the existing clusters.

Figure 6:
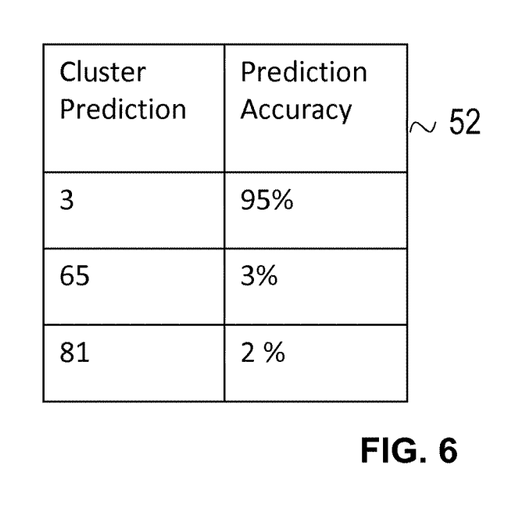
FIG. 6 shows an example schematic view of an output of the clustering method.

The output of the model is then an association of a specific UE to a cluster as shown in FIG. 6. The clustering model produces a table 52 with a dataset as shown for each UE that indicates and includes the possible clusters than can be associated to that UE, wherein the matching percentage is also provided. This output now enables the network, especially one or several network nodes, to use an advanced reasoning without the need to store all the information and to exploit this compact representation. This is especially true when the cluster specific user profile is assigned to each UE in the cluster.

Figure 7:
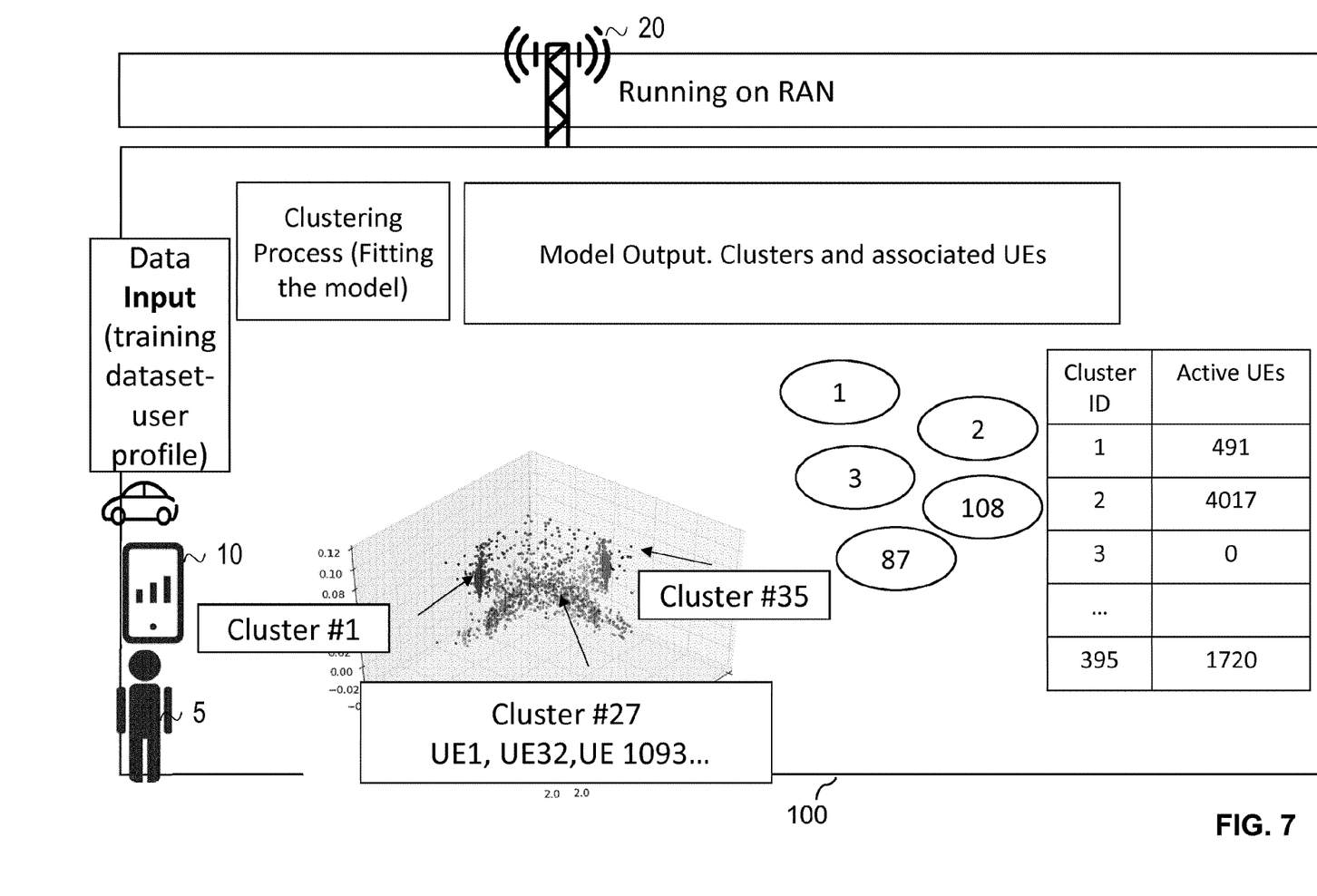
FIG. 7 shows an example schematic view of an unsupervised learning or clustering in order to generate the different clusters.

FIG. 7 shows a schematic architectural view how the clustering may be carried out at the entity 100 provided in the radio access network, e.g. on a radio access network node 20. Data from a UE 10 which belongs to a subscriber 5 is collected. The collected data is then fitted to the different clusters in the clustering process and the UE is grouped into one of the clusters. The user profile data as data input is used in the clustering process in an unsupervised learning. The information can be used for improving the radio access network and the core network decision making ability. In the example shown only three features are shown, but it should be understood that many more features are present. As shown in FIG. 7, the cluster with number 27 receives the information on the UEs that associate with a specific cluster. In the example shown UE1, UE32 and UE1093 associate with cluster #27.

An example output of entity 100 comprises the different cluster with the associated (active and/or passive) users. Furthermore, the cluster specific user profile is stored in entity 100 and can be output to other entities.

Figure 8:
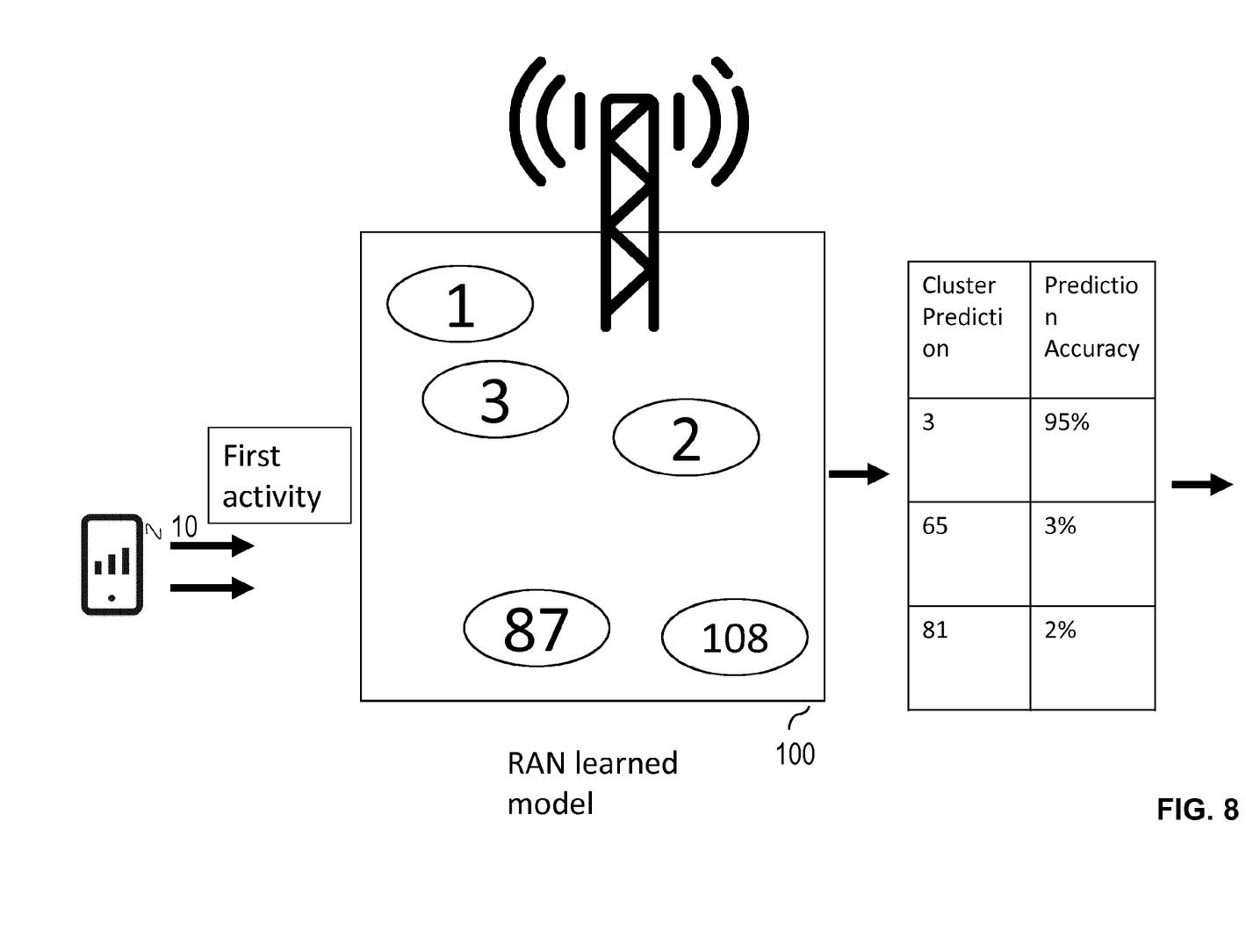
FIG. 8 shows an example schematic view of a new user entity connecting to the network with the prediction to which cluster the UE belongs based on the user activity.

FIG. 8 shows an example when a new UE connects to a radio access node 20 which then predicts based on the assumption that entity 100 in the radio access node carries out the clustering to which cluster the new UE 10 belongs. The first activity pattern is fed to the learned clustering model in the radio access network node. FIG. 8 shows that cluster 3 seems to be the cluster supporting periodic industrial traffic based on the attributes of the cluster. This then allows the cellular network, the radio access network node or any other node to directly configure grants for the communication based on the activity patterns so that resources are saved and the performance is optimized.

Figure 9:
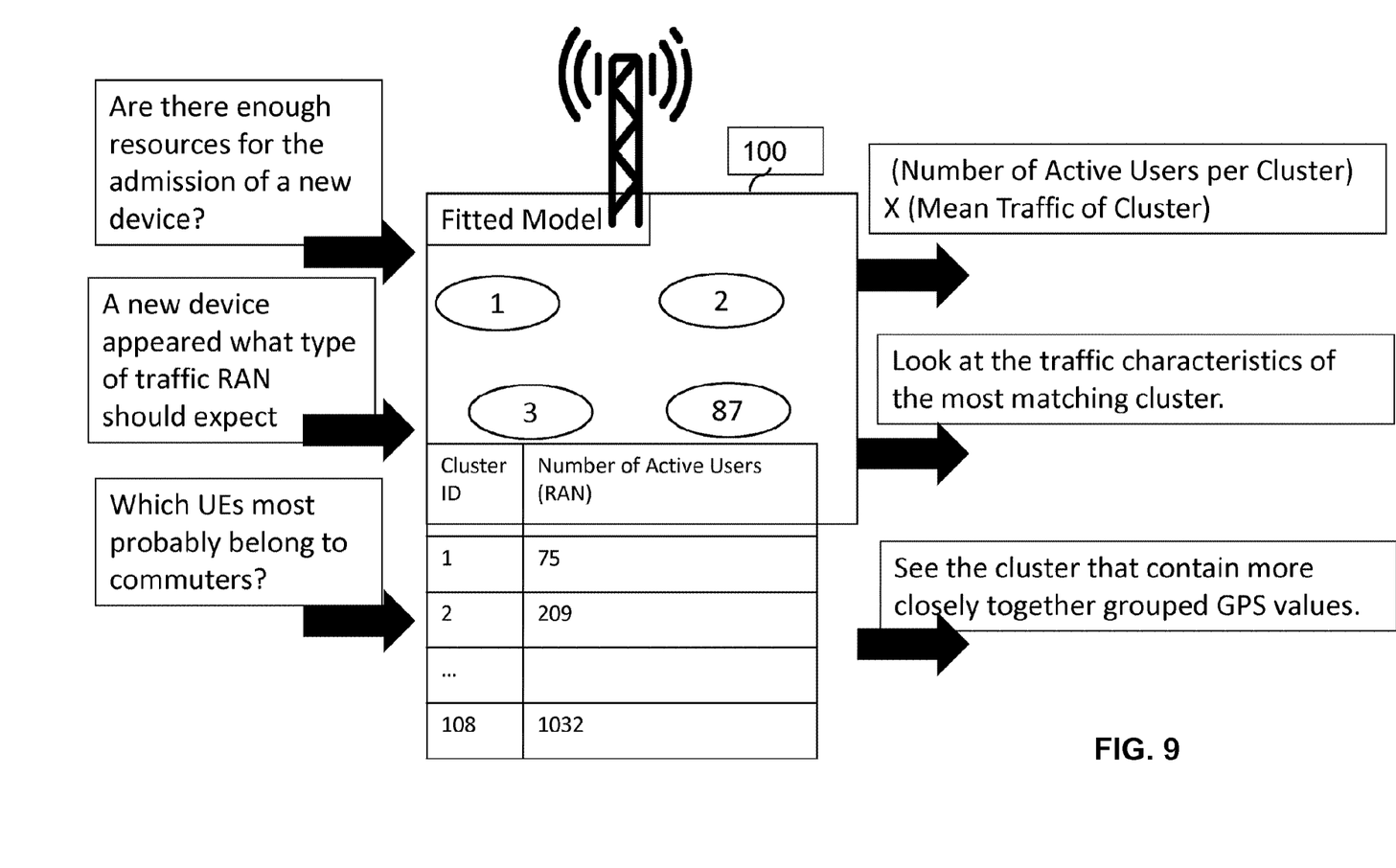
FIG. 9 shows a schematic architectural view of how the clustering can be used by the network.

FIG. 9 shows further use cases on how the clusters can be used for controlling a part of the cellular network. By way of example by looking at the characteristic of clusters such as a mean traffic per cluster or any other parameter of the cluster specific user profile combined with the number of active UEs per cluster, the radio access network has an understanding of what type of traffic at the future time periods each cluster can potentially create, e.g. whether the traffic will be bursty traffic, whether it is periodic, whether the data amount is low or high or whether the traffic is randomly distributed. A scheduling function provided in the radio access node can do more conservative admission control if the clusters related to the corresponding traffic such as URLLC (ultra reliable low latency communication traffic are known to produce traffic at the next time periods. As shown on the left side of FIG. 9, the entity using the cluster information can check whether there are enough resources for the admission of a new device. A further question that can be decided is when a new UE appears what type of traffic in the radio access network has to be expected. Furthermore, it can be determined whether the UE is a UE that takes a similar path every day, has a similar geographic pattern depending on the time of the day. Accordingly, a traffic prediction can be carried out based on the number of active users per cluster multiplied by the mean traffic of each cluster. Furthermore, it is possible to look at the traffic characteristics of the most matching cluster for the traffic prediction. As discussed in connection with FIG. 4, when the best matching cluster is known, is traffic the UE will generate can be predicted quite accurately. Furthermore, a cluster can be determined that contains UEs having closely related or closely grouped location values.

Either the local radio access network or an entity at the core network can collect and calculate the radio access network based clusters, so that a network node at the core network can generate clusters for the complete cellular network taking into consideration the available clusters at the different radio access network nodes. This type of total abstraction knowledge of the network allows the creation of a deep understanding of the hole operation of the network without needing to store large piles of information. This is explained further below in connection with FIG. 13.

The information about the different clusters and the cluster specific parameters can be stored either locally at the radio access network nodes when the UE is active in the system and may be shared between different radio access network nodes, wherein the information is only shared with other network nodes or a central node when the UEs are not active anymore. It is also possible to keep all the information at a node in the core network and to have the radio access network nodes transmit and receive any needed information from or to the core network node. As indicated above, the UE can belong to multiple clusters. The model also supports distributed deployments where the construction of the clusters and the application of the learnt model can be performed at the edge of the network, by way of example in the cloud.

Figure 10:
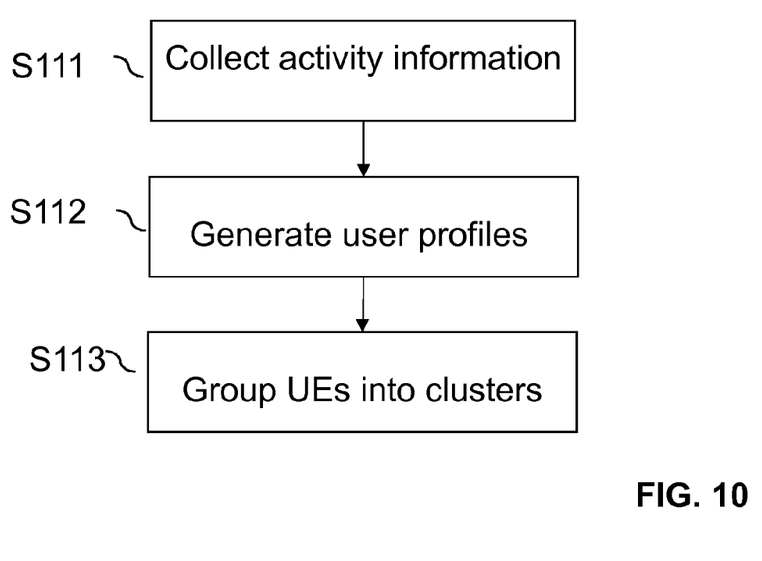
FIG. 10 shows an example schematic view of a flowchart comprising the steps carried out by a network entity configured to cluster the user entities into different clusters.

FIG. 10 summarizes some of the steps carried out at the network entity 100 which allows the reduction of the amount of information that is needed for controlling the network and for the processing. At step S111 activity information is collected for one or several user entities. Step S111 can be carried out during a model training phase, can be carried during a model retraining, or can be carried out when a new user entity accesses the cellular network. The collected activity information can comprise the UE originating activity parameters, such as the traffic patterns or the location information and/or can comprise the radio access network related or originating activity parameters, such as the visited radio access network nodes and the consumed radio resources. This information is collected and based on this information in step S112 the user profile is generated for each of the UEs that is active in the network or becomes active in the network. In step S113 each of the UEs is then grouped into the different clusters taking into account the similarities of the activity parameters of the user profiles. As discussed in connection with FIG. 4, the different clusters group the UEs together that have similar activity parameters. Some further steps not shown in FIG. 10 relate to the determination of the cluster specific user profile and the controlling of the network based on the cluster specific user profile.

Figure 11:
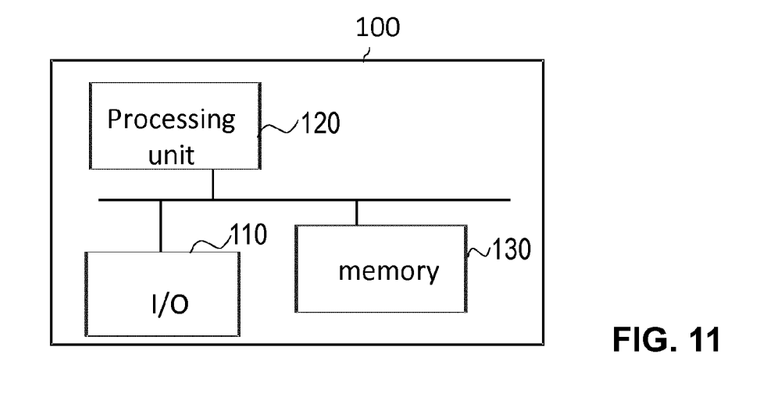
FIG. 11 shows an example schematic representation of the network entity configured to cluster user entities into different clusters.

FIG. 11 shows a schematic architectural view of the network entity that can carry out the above-mentioned steps with the clustering of the UEs into the different clusters and eventually the controlling activities in the network, such as the admission of new UEs or the granting of communication time in the network. The entity 100 can be incorporated into any node of the radio access network or may be a standalone node coupled to the radio access network. Furthermore, the entity 100 can be part of the core network. The entity 100 comprises an interface or input/output 110 which is provided for transmitting user data or control messages to other entities and which is provided for receiving user data and control messages from other entities. The interface is especially qualified to collect the activity parameters from the UEs and to send the cluster information out to other entities which may require this kind of information. The entity 100 furthermore comprises a processing unit 120 which is responsible for the operation of the entity 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above-described functionalities in which entity 100 is involved.

Figure 12:
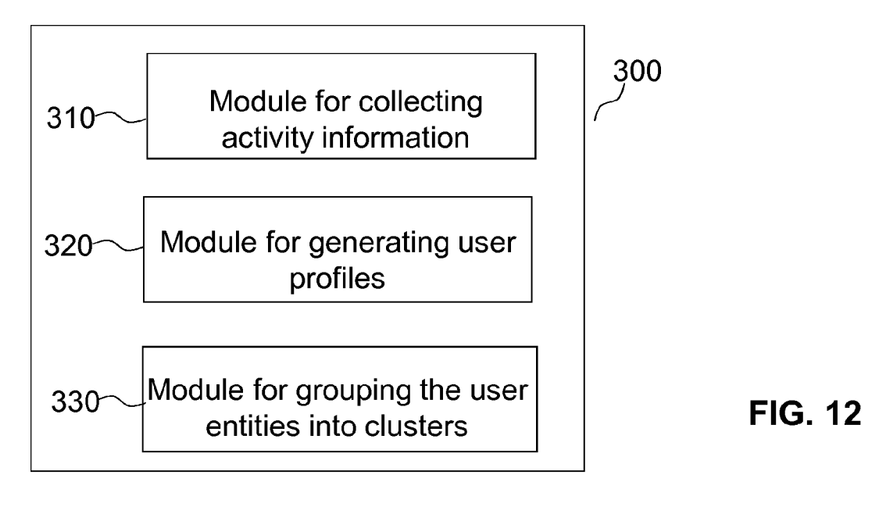
FIG. 12 shows another example schematic representation of a network entity configured to cluster the different user entities into different clusters.

FIG. 12 shows another schematic view of the network entity 300 which is configured to carry out the above-mentioned steps. The entity 300 can comprise a first module 310 configured to collect the activity information from the UEs in the network. A module 320 can be provided for generating the user profile based on the activity parameters. Module 320 may generate the user profiles as discussed in connection with FIGS. 1 and 2. A module 330 is provided for grouping the user entities into different clusters. Optionally, a further module (not shown) may be provided which might be used for actively controlling at least a part of the cellular network based on the provided information.

Figure 13:
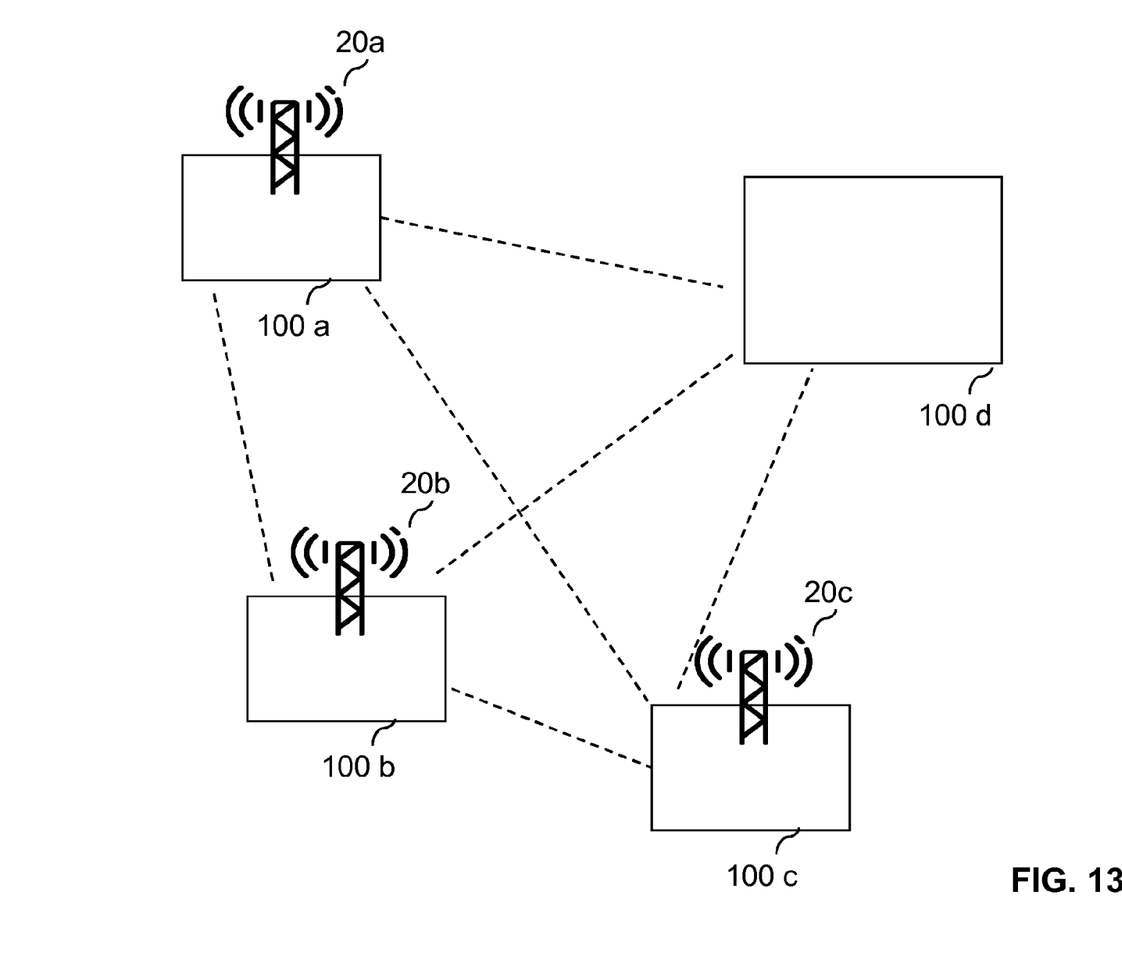
FIG. 13 shows an example schematic architectural view with different radio access nodes collecting data, wherein a further network entity collects the information from the different radio access nodes in order to adapt and distribute cluster related information it to the different radio access nodes.

FIG. 13 shows an embodiment describing the interaction between different entities. As shown in FIG. 13, different radio access nodes 20*a*, 20*b* and 20*c* are shown. At each of the radio access nodes a corresponding network entity 100*a*, 100*b* or 100*c* is provided which can operate as discussed above. A further entity 100*d* is provided which collects the cluster information from the different network entities connected to the radio access nodes. Based on the received cluster information the network entity, which can be provided in the core network or in the radio access network, may generate new clusters based on the information received from the different radio access nodes. With the overview over the whole UE activities additional clusters may be generated or the UEs may be grouped into a completely new cluster architecture. The additional cluster information or the new cluster information may then be distributed to the different radio access network nodes and to the corresponding network entities 100*a* to 100*c*. Either network node 100*d* or the network nodes 100*a* to 100*c* can perform the controlling.

From the above said some general conclusions can be drawn for the network nodes and their operation.

As far as the grouping of the user entities into clusters is concerned, the grouping can comprise the step of determining the number of clusters into which the plurality of clusters are grouped based on the user profiles of the plurality of user entities. The number of clusters and the change of the number of clusters during the grouping is a sign whether the model has already learnt the needed clusters that are required to group together the different activity parameters.

The grouping can comprise the step of clustering of the user entities into the different clusters.

The plurality of user entities can be grouped into the different clusters such that each user entity is grouped only into one of the clusters. This was discussed in connection with FIG. 3 and was also called hard labeling.

Furthermore, it is possible that the plurality of user entities are grouped into different clusters such that each user entity is grouped into at least two different clusters with a cluster specific likelihood. This was shown in FIG. 3 with the name of soft labeling.

The training phase or the determination of the number of clusters may be stopped when the number of clusters does not change by more than a predefined threshold during the grouping of the plurality of user entities into the different clusters.

The number of clusters can be determined in a learning phase at the beginning and may be continued until the number of clusters does not change by more than a threshold. The determining of the number of clusters may also be started again when the cluster specific likelihood, for one of the user entities, is higher than a first threshold for two or more clusters. This was discussed above in connection with FIG. 5. When the number of user entities for which the cluster specific likelihood is higher than the first threshold for two or more clusters is higher than a second threshold, the determining of the number of clusters may be started again.

Furthermore, it is possible to determine the number of active user entities in each of the clusters.

Furthermore, a cluster specific user profile can be generated representing an average of the user profiles of all user entities grouped into the corresponding cluster. The cluster specific user profile can then replace the user profile of each user entity in the corresponding cluster. It is then possible to control part of the network based on a reduced amount of data. For a precise traffic prediction only the number of active users per cluster and the cluster specific user profile is needed. The cluster specific user profile can include the same pieces of information as the user profile shown in FIG. 1, but averaged over all users of the cluster.

This information can help to predict the user traffic. When a known UE connects to the network again, this UE may be directly grouped into the known cluster. As an alternative, activity parameters may be collected at the beginning in order to see whether the UE activity has changed or not.

Furthermore, it is possible to control at least part of the cellular network taking into account the grouping of the user entities into the different clusters.

With the knowledge of the grouping of the user entities into the clusters, future data traffic can be predicted and the network can take into account this information.

By way of example a data traffic can be predicted in at least a part of the cellular network based on the cluster specific user profiles of the different clusters and based on the number of active users in each of the clusters. The controlling can relate to the part of the cellular network controlled by the node where the network entity is located or to which the information of network entity 100 is transmitted.

Furthermore, an admission of a new user entity or of new user entities into the cellular network can be controlled based on the predicted data traffic.

Furthermore, it is possible to schedule at least some of the user entities in the radio access network of the cellular network taking into account the number of active user entities in each of the clusters and the activity parameters present in the cluster specific user profiles.

The activity parameters were discussed above in connection with FIGS. 1 and 2 and the activity parameters can include parameters such as the traffic type, e.g. the URLCC traffic, critical communication, periodic messaging such as a V2X communication.

Furthermore, it is possible to determine a mean data traffic per cluster based on the number of active mobile entities in the corresponding cluster and the cluster specific user profiles in the corresponding cluster. The future data traffic can then be predicted based on the mean data traffic per cluster.

The grouping into the different clusters may be carried out for one radio access node of the cellular network. Furthermore, it is possible to determine the grouping into the different clusters for several radio access nodes. The controlling of at least part of the cellular network can then be carried out taking into account the clusters from the plurality of radio access nodes. Preferably, a new grouping of the plurality of user entities into the different clusters can be carried out taking into account the clusters from the several radio access nodes as discussed in connection with FIG. 13. Furthermore, it is possible to use additional information available at the core network part of the cellular network such as the QoS flow or bearer information.

The new grouping of the different clusters may be carried out at one node of the cellular network, such as node 100d shown in FIG. 13, and may then be distributed to the other nodes of the cellular network.

When a soft labeling is used, the controlling of a part of the cellular network, only the mobile entities may be considered for which the likelihood that they correspond to the corresponding cluster is higher than a threshold. By way of example in connection with FIG. 3 the UE belongs to one cluster with a likelihood of 3%. When predicting the data traffic per cluster, this cluster 65 may not take into account the UE which only belongs to this cluster with a likelihood of 3%. Only UEs may be considered for which the likelihood is higher than e. g. 30%, 50% or 70%. As an alternative, it is possible to weight the predicted data traffic with rates that depend on the likelihood. If the likelihood is high, a higher weight may be used, whereas when the likelihood is low, a lower weighting parameter may be used.

The activity parameters can comprise parameters such as a data traffic pattern of the user entity, location information of the user entity, the consumed radio resources of the user entity, the visited radio access nodes visited in the cellular network by the user entity, and/or an assigned quality of service assigned to the user entity.

The above-described application provides a powerful and compact abstraction of active UE users, so that the amount of information that needs to be stored and processed is reduced. The proposed abstraction allows the radio access network and the core network to do advanced reasoning based on the number of clusters created. This kind of abstraction makes the scheduling easier and relaxes the need to keep profile per user, as only information may be kept that describes the cluster. The scheduler of the radio access network is able to make decisions on taking into account the number of UEs that belong to a specific cluster and the characteristics of the cluster.

Furthermore, it is possible to apply similarity matching for the radio access network user profiles for rapidly assigning new users to the available clusters. This is especially helpful for UEs that generate a critical type of data traffic.

A cluster may also be used by the network to distinguish between different quality of service requirements or different types of users. A cluster can assist in the network to decide if it can admit a certain UE into a certain QoS category based on how occupied the clusters are.

The invention claimed is:

1. A method for grouping a plurality of user entities connected to a cellular network into different clusters, the method comprising:
   collecting, for each of the plurality of user entities, activity information comprising different activity parameters, each activity parameter describing an activity of the corresponding user entities in the cellular network;
   generating, for each of the plurality of user entities, a user profile comprising the activity parameters for the corresponding user entity;
   grouping the plurality of user entities into the different clusters based on a similarity of the activity parameters of the user profiles;
   generating a cluster specific user profile representing an average of the user profiles of all user entities grouped into the corresponding cluster, and
   replacing the user profile of each user entity in the corresponding cluster by the cluster specific user profile.

2. A network entity configured to group a plurality of user entities connected to a cellular network into different clusters, the network entity comprising:
   a memory; and
   at least one processing unit, wherein the network entity is configured to:
   collect, for each of the plurality of user entities, activity information comprising different activity parameters, each activity parameter describing an activity of the corresponding user entities in the cellular network;
   generate, for each of the plurality of user entities, a user profile comprising the activity parameters for the corresponding user entity;
   group the plurality of user entities into the different clusters based on a similarity of the activity parameters of the user profiles;
   generate a cluster specific user profile representing an average of the user profiles of all user entities grouped into the corresponding cluster, and
   replace the user profile of each user entity in the corresponding cluster by the cluster specific user profile.

3. The network entity of claim 2, further being operative, for grouping the plurality of users, to determine the number of clusters into which the plurality of clusters are grouped based on the user profiles of the plurality of user entities.

4. The network entity of claim 2, further being operative, for grouping the plurality of user entities, to cluster the user entities into the different clusters.

5. The network entity of claim 2, further being operative to group the plurality of user entities into the different clusters such that each user entity is grouped only into one of the clusters.

6. The network entity of claim 2, further being operative to group the plurality of user entities into the different clusters such that each user entities grouped into at least 2 different clusters with a cluster specific likelihood.

7. The network entity of claim 3, further being operative to stop determining the numbers of clusters when the number of clusters does not change by more than a predefined threshold during the grouping of the plurality of user entities into the different clusters.

8. The network entity of claim 6, further being operative to continue or start again the step of determining the number of clusters, when the cluster specific likelihood, for one of the user entities, is higher than a first threshold for 2 or more clusters, and when the number of user entities for which the cluster specific likelihood is higher than the first threshold for 2 or more clusters, is higher than a second threshold.

9. The network entity of claim 2, further being operative to determine a number of active user entities in each of the clusters.

10. The network entity of claim 2, further being operative to control at least a part of the cellular network taking into account the grouping of the plurality of user entities into the different clusters.

11. The network entity of claim 8, further being operative to predict a data traffic in at least the part of the cellular network based on the cluster specific user profiles of the different clusters and based on the number of active user entities in each of the clusters.

12. The network entity of claim 11, further being operative, for controlling at least a part of the cellular network, to control an admission of new user entities into the cellular network based on the predicted data traffic, wherein a new user entity is not admitted to the cellular network, if the predicted data traffic does not allow an admission.

13. The network entity of claim 2, further being operative, for controlling at least a part of the cellular network, to schedule at least some of the user entities in a radio access network of the cellular network taking into account the number of active devices in each of the clusters and the cluster specific user profiles.

14. The network entity of claim 9, further being operative to determine a mean data traffic per cluster based on the number of active mobile entities in the corresponding cluster and cluster specific user profile of the corresponding cluster, and to predict a future data traffic in the cellular network based on the mean data traffic per cluster.

15. The network entity of claim 2, further being configured as a radio access node of the cellular network.

16. The network entity of claim 2, further being operative to determine the grouping into the different clusters for a plurality of the radio access nodes, and to control at least part of the cellular network taking to account the clusters from the plurality of radio access nodes, and preferably to carry out a new grouping of the plurality of user entities into the different clusters taking into account the clusters from the plurality of radio access nodes and information available from a core network part of the cellular network.

17. The network entity of claim 16, further being operative to distribute information about the new grouping to other nodes of the cellular network.

18. The network entity of claim 6, further being operative, for controlling at least part of the cellular network taking into account the grouping into the different clusters, to only consider the mobile entities, when the likelihood that they correspond to the corresponding cluster is higher than a threshold.

19. A non-transitory computer readable medium storing a computer program comprising program code for configuring a network node to perform the method of claim 1.

* * * * *